US011552561B1

(12) United States Patent
Roessig

(10) Patent No.: US 11,552,561 B1
(45) Date of Patent: Jan. 10, 2023

(54) SWITCHED CAPACITOR RECIRCULATING CONVERTER CIRCUITS

(71) Applicant: Empower Semiconductor, Inc., Milpitas, CA (US)

(72) Inventor: Trey Roessig, Palo Alto, CA (US)

(73) Assignee: Empower Semiconductor, Inc., San Jose, CA (US)

( * ) Notice: Subject to any disclaimer, the term of this patent is extended or adjusted under 35 U.S.C. 154(b) by 0 days.

(21) Appl. No.: 17/852,203

(22) Filed: Jun. 28, 2022

Related U.S. Application Data

(60) Provisional application No. 63/302,500, filed on Jan. 24, 2022.

(51) Int. Cl.
*H02M 3/07* (2006.01)
*H02M 1/08* (2006.01)

(52) U.S. Cl.
CPC .............. *H02M 3/07* (2013.01); *H02M 1/08* (2013.01)

(58) Field of Classification Search
CPC .................................. H02M 3/07; H02M 1/08
See application file for complete search history.

(56) References Cited

U.S. PATENT DOCUMENTS

| | | | | |
|---|---|---|---|---|
| 6,172,493 B1* | 1/2001 | Grant | ................... | H03K 17/063 323/224 |
| 10,103,727 B1* | 10/2018 | Hsiao | ...................... | H02M 1/08 |
| 10,658,927 B1* | 5/2020 | Pelicia | ..................... | H02M 3/07 |
| 10,734,893 B1* | 8/2020 | Abesingha | ............... | H02M 3/07 |
| 10,778,242 B2* | 9/2020 | Huang | ................... | H03M 1/468 |
| 11,057,030 B1* | 7/2021 | Bagheri | ................... | H02M 3/07 |
| 11,196,339 B1* | 12/2021 | Jodka | ...................... | H02M 1/08 |
| 2004/0080302 A1* | 4/2004 | Sutardja | ............... | H03K 17/166 323/282 |
| 2016/0197552 A1* | 7/2016 | Giuliano | ................. | H02M 3/07 363/60 |
| 2017/0244318 A1* | 8/2017 | Giuliano | ................. | H02M 1/42 |

* cited by examiner

*Primary Examiner* — Kyle J Moody
(74) *Attorney, Agent, or Firm* — Kilpatrick Townsend & Stockton LLP

(57) ABSTRACT

A converter circuit. In one aspect, the converter circuit includes an input terminal, a first output terminal and a second output terminal, and first, second, third and fourth capacitors coupled to a plurality of switches, where the plurality of switches are arranged to repetitively cycle the first, second, third and fourth capacitors between a first state and a second state to generate first and a second output voltages, where in the first state, the first and second capacitors are connected in parallel with each other and in series with a third capacitor to apply a first fraction of an input voltage at the first output terminal, and in the second state, the first and second capacitors are connected in series with each other and in parallel with the fourth capacitor to apply a second fraction of the input voltage at the second output terminal.

20 Claims, 5 Drawing Sheets

US 11,552,561 B1

SWITCHED CAPACITOR RECIRCULATING CONVERTER CIRCUITS

CROSS REFERENCE TO RELATED APPLICATIONS

This application claims priority to U.S. provisional patent application Ser. No. 63/302,500, for "Switched Capacitor Low-Voltage Recirculating Gate Drive Circuits" filed on Jan. 24, 2022, which is hereby incorporated by reference in entirety for all purposes.

FIELD

The described embodiments relate generally to voltage converters, and more particularly, the present embodiments relate to switched capacitor recirculating gate drive circuits used in voltage converters.

BACKGROUND

A wide variety of electronic devices are available for consumers today. Many of these devices have integrated circuits that are powered by regulated low voltage DC power sources. These low voltage power sources are often generated by dedicated power converter circuits that use a higher voltage input from a battery or another power source. In some applications, the dedicated power converter circuit can be one of the largest power dissipating components of the electronic device and can sometimes consume more space than the integrated circuit that it powers. As electronic devices become more sophisticated and more compact, more efficient power converter circuits are called for.

SUMMARY

In some embodiments, a circuit is disclosed. The circuit includes a switched capacitor circuit that includes first, second, third and fourth capacitors coupled to a plurality of switches, a first output terminal, a second output terminal, an power input terminal and a ground coupled to the switched capacitor circuit, where the switched capacitor circuit repetitively cycles between a first state and a second state, and where when in the first state, the first capacitor is coupled in parallel with the second capacitor, and the first and second capacitors are coupled between the ground and the first output terminal, and where when in the second state, the first capacitor is coupled in series with the second capacitor, and the series connected first and second capacitors are coupled between the second output terminal and the ground, and where when in the first and second states, the first output terminal is connected to the power input terminal via the third capacitor, and where when in the first and second states, the second output terminal is connected to ground via the fourth capacitor.

In some embodiments, the switched capacitor circuit is arranged to generate a first output voltage at the first output terminal and a second output voltage at the second output terminal.

In some embodiments, a value of the first output voltage is different than that of the second output voltage.

In some embodiments, the second output voltage is greater than the first output voltage.

In some embodiments, the first output voltage is ⅓ of a voltage at the power input terminal.

In some embodiments, the second output voltage is ⅔ of a voltage at the power input terminal.

In some embodiments, the first output voltage is used to drive a high-side transistor of a half-bridge circuit, and the second output voltage is used for driving a low-side transistor of the half-bridge circuit.

In some embodiments, a circuit is disclosed. The circuit includes an input terminal, a first output terminal and a second output terminal, first, second, third and fourth capacitors coupled to a plurality of switches, the plurality of switches arranged to repetitively cycle the first, second, third and fourth capacitors between a first state and a second state to generate a first output voltage, in response to receiving an input voltage at the input terminal, at the first output terminal and a second output voltage at the second output terminal, where in the first state, the first and second capacitors are connected in parallel with each other and in series with a third capacitor to apply a first fraction of the input voltage at the first output terminal, and where in the second state, the first and second capacitors are connected in series with each other and in parallel with the fourth capacitor to apply a second fraction of the input voltage at the second output terminal.

In some embodiments, the first fraction is different than the second fraction.

In some embodiments, the first fraction is ⅓ of the input voltage.

In some embodiments, the second fraction is ⅔ of the input voltage.

In some embodiments, the second output voltage is greater than the first output voltage.

In some embodiments, the first output voltage is used to drive a high-side transistor of a half-bridge circuit, and the second output voltage is used for driving a low-side transistor of the half-bridge circuit.

In some embodiments, a power conversion circuit is disclosed. The power conversion circuit includes a circuit includes first, second, third and fourth capacitors coupled to a plurality of switches, a first output terminal, a second output terminal, an input terminal and a ground coupled to the circuit, where the circuit repetitively cycles between a first state and a second state to generate a first output voltage at the first output terminal and a second output voltage at the second output terminal, where when in the first state the first capacitor is coupled in parallel with the second capacitor, and the first and second capacitors are coupled between the ground and the first output terminal, where when in the second state the first capacitor is coupled in series with the second capacitor, and the series connected first and second capacitors are coupled between the second output terminal and the ground, where the first output terminal is connected to the input terminal via the third capacitor, where the second output terminal is connected to ground via the fourth capacitor, and where the first output voltage is used to drive a high-side transistor of a half-bridge circuit, and the second output voltage is used for driving a low-side transistor of the half-bridge circuit.

In some embodiments, a value of the first output voltage is different than that of the second output voltage.

In some embodiments, the second output voltage is greater than the first output voltage.

In some embodiments, the first output voltage is ⅓ of a voltage at the input terminal.

In some embodiments, the second output voltage is ⅔ of a voltage at the input terminal.

In some embodiments, the power conversion circuit further includes a fifth capacitor and a sixth capacitor, where when in the first state the fifth capacitor is coupled in series with the sixth capacitor, and the fifth and sixth capacitors are coupled between the input terminal and the first output terminal.

In some embodiments, when in the second state, the fifth capacitor is coupled in parallel with the sixth capacitor, and the fifth and sixth capacitors are coupled between the input terminal and the first output terminal.

DETAILED DESCRIPTION

Figure 1A:
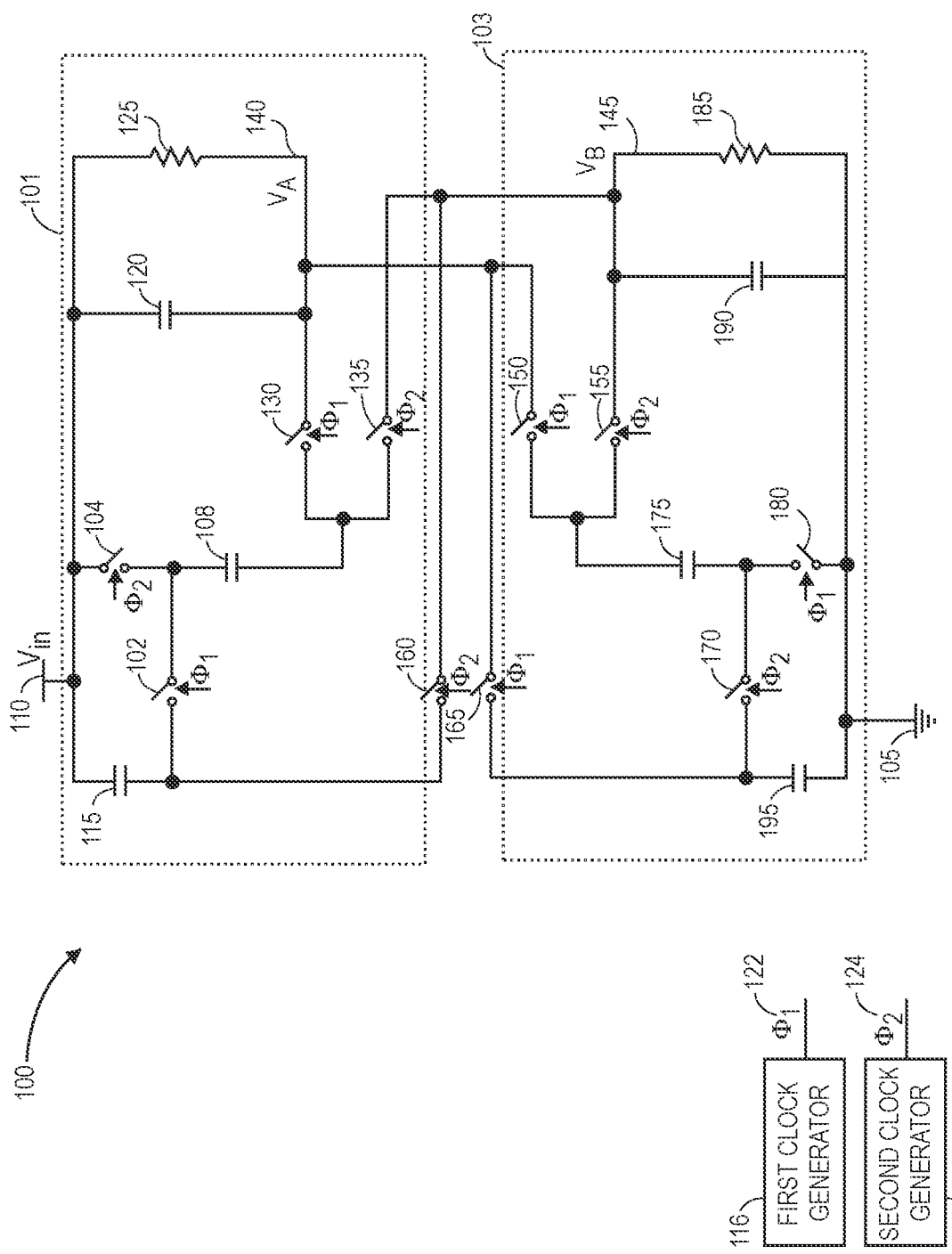
FIG. 1A illustrates a schematic of a switched capacitor recirculating gate drive circuit according to an embodiment of the disclosure.

Circuits and related techniques disclosed herein relate generally to voltage converters. More specifically, circuits, devices and related techniques disclosed herein relate to switched capacitor recirculating gate drive circuits used in voltage converters. In some embodiments, switched capacitor recirculating gate drive circuits can generate a first output voltage and a second output voltage, where the second output voltage is greater than the first output voltage. The first output voltage can be utilized for driving a high-side transistor in a half-bridge circuit, and second output voltage can be utilized for driving a low-side transistor in the half-bridge circuit. In various embodiments, switched capacitor recirculating gate drive circuits can maintain an appropriate voltage level for the first and second output voltages even when an input voltage drops to a relatively low value. In some embodiments, switched capacitor recirculating gate drive circuits can be used in DC-DC power conversion applications, where embodiments of the disclosure can maintain an appropriate voltage level for the output voltages with a relatively low input voltage. These power conversion applications can include, but are not limited to, on-chip supply rails for drivers of switching regulators, and battery-operated applications where a battery voltage may drop from a charged voltage of, for example, 4.2 V to an uncharged voltage of 2.7 V.

In various embodiments, switched capacitor recirculating gate drive circuits can enable relatively high efficiency for the voltage converter because charge in the flying capacitors can be recirculated and reused from the first output voltage into the second output voltage. In some embodiments, the switched capacitor recirculating gate drive circuits can enable maximized gate drive voltages in a DC-DC power converter while keeping the supply current at a relatively low value. Various inventive embodiments are described herein, including methods, processes, systems, devices, and the like.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1 illustrates a schematic of a switched capacitor recirculating gate drive circuit according to an embodiment of the disclosure. As shown in FIG. 1, circuit 100 can include a top section 101 that can generate a voltage $V_A$ at node 140 and a bottom section 103 that can generate a voltage $V_B$ at node 145. Top section 101 can include capacitors 115, 108 and 120 that are connected to switches 102, 104, 130 and 135. Bottom section 103 can include capacitors 195, 175 and 190 that are connected to switches 170, 180, 155 and 150. Circuit 100 can also include a first clock generator 116 that generates a first clock signal 122, and a second clock generator 118 that generates a second clock signal 124.

Switches 102, 130, 165, 150, and 180 can be controlled by the first clock signal 122, while switches 104, 135, 160, 155, and 170 can be controlled by the second clock signal 124. The first clock signal and the second clock signal, 122, 124, respectively, are non-overlapping clock signals. Circuit 100 can be connected to an input voltage $V_{in}$ at node 110 and to a ground 105, and generate first output voltage $V_A$ at node 140, and second output voltage $V_B$ at node 145. In circuit 100, resistor 125 represents an equivalent resistance for the charging current for a high side switch 172, and resistor 185 represents an equivalent resistance for the charging current for a low side switch 174, as described further below in FIG. 1B. In some embodiments, a value for each of resistors 125 and 185 can be, for example, 1000 ohms, however, other suitable resistance values can be used and are within the scope of this disclosure. In some embodiments, switches 102, 104, 130, 135, 150, 160, 165, 170 and 180 can be silicon MOSFETs. As appreciated by one of ordinary skill in the art having the benefit of this disclosure, other suitable semiconductor switches can be utilized and are within the scope of this disclosure.

Figure 1B:
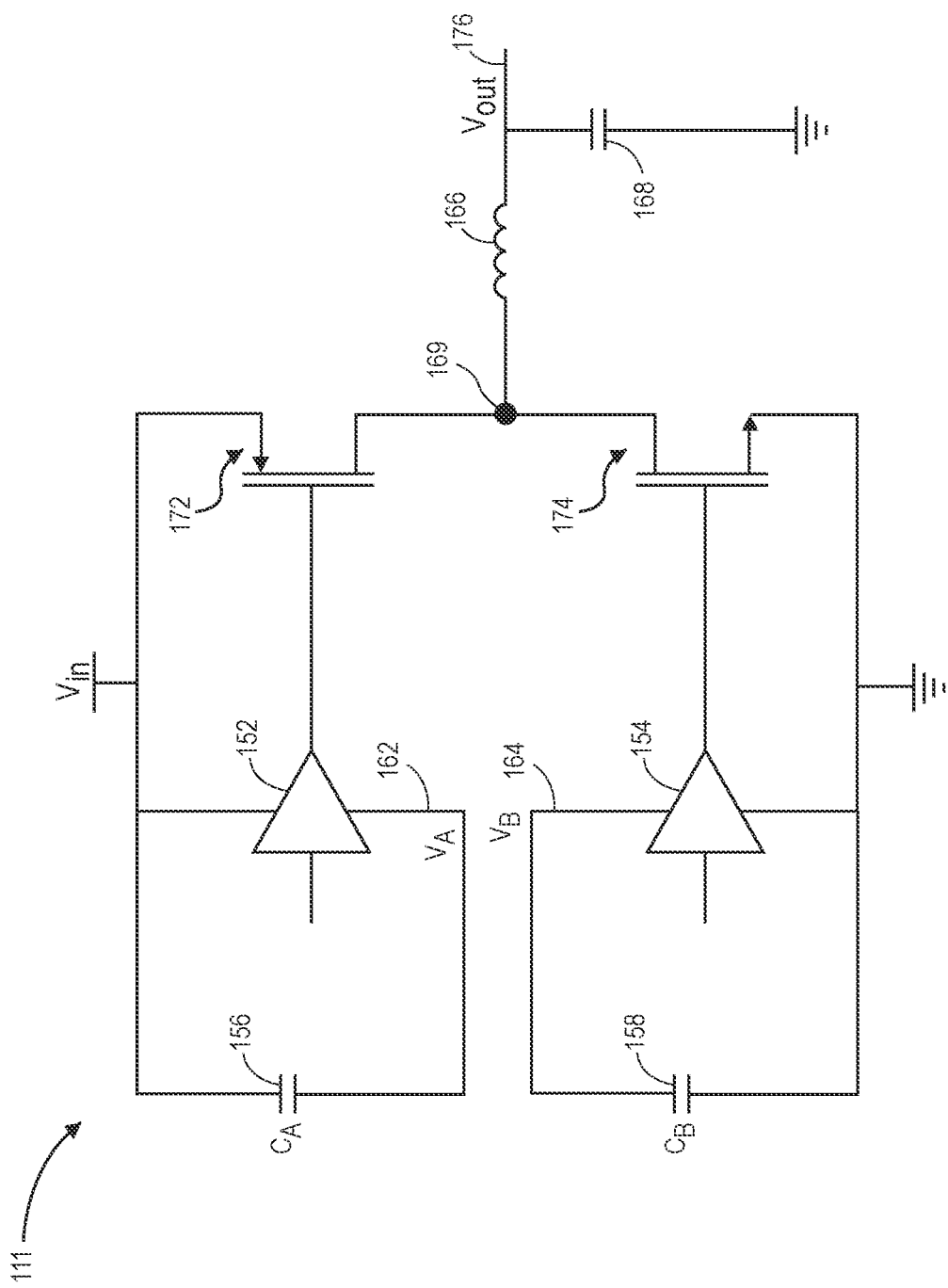
FIG. 1B illustrates a schematic of a power converter circuit, where the circuit of FIG. 1A can be employed to generate internal voltages in the power converter circuit, according to an embodiment of the disclosure.

FIG. 1B illustrates a schematic of a power converter circuit 111, where circuit 100 can be employed to generate voltages $V_A$ and $V_B$ in circuit 111, according to an embodiment of the disclosure. Voltages $V_A$ and $V_B$ can be used as bootstrapped voltage rails for driving gates of power switches 172 and 174. In circuit 111, the high side switch 172 and the low side switch are connected in series. In some embodiments, the high side and low side switches can be silicon MOSFETs, for example, the high side switch 172 can a be a P-MOSFET and the low side switch 174 can be an N-MOSFET. In the illustrated embodiment, the high side and low side switches can form a buck converter circuit, where a switch node 169 is connected to an inductor 166.

The inductor 166 can be connected to an output capacitor 168. The power converter circuit 111 can generate an output voltage at node 176. The gate of the high side switch 172 can be driven by a driver 152 that is connected between $V_{in}$ and $V_A$ at node 162. The gate of the low side switch 174 can be driven by a driver 154 that is connected between $V_B$ at node 164 and the ground. Capacitor 156 can be connected between $V_{in}$ and $V_A$, and capacitor 158 can be connected between $V_B$ and ground.

As shown in FIG. 1B, voltages $V_A$ and $V_B$ are bootstrapped voltages, i.e., their voltages are relative to the supply voltage $V_{in}$. For example, in one embodiment $V_{in}$ can be 1.8 V, and an optimized gate drive voltage for high side switch 172 and low side switch 174 can be 1.0 V. Thus, to optimize the operation of high side switch 172 and low side switch 174, capacitors 156 and 158 need to each be charged to 1.0 V such that drivers 152 and 154 can supply the optimal drive voltage. Therefore, a value for $V_A$ is $V_{in}$−1.0 V, or 0.8 V, and a value for $V_B$ is 1.0 V.

Embodiments of the present disclosure can generate optimized values for voltages $V_A$ and $V_B$ while reusing a gate drive current of the driver 152 for gate driving in the driver 154. By reusing the gate drive current of the high side switch for gate driving of the low side switch, an overall efficiency of the power converter circuit 111 can improve. Further, when $V_{in}$ drops such that $V_{in}/2$ becomes a relatively low value, embodiments of the present disclosure can maintain the voltages $V_A$ and $V_B$ such that $V_B$ remains higher than $V_A$, thus optimizing the gate drive voltages for the high side and low side switches such that an on-resistance ($R_{dson}$) of the high side and low side switches are optimized, resulting in improved operational efficiency of the converter.

Figures 2A, 2B:
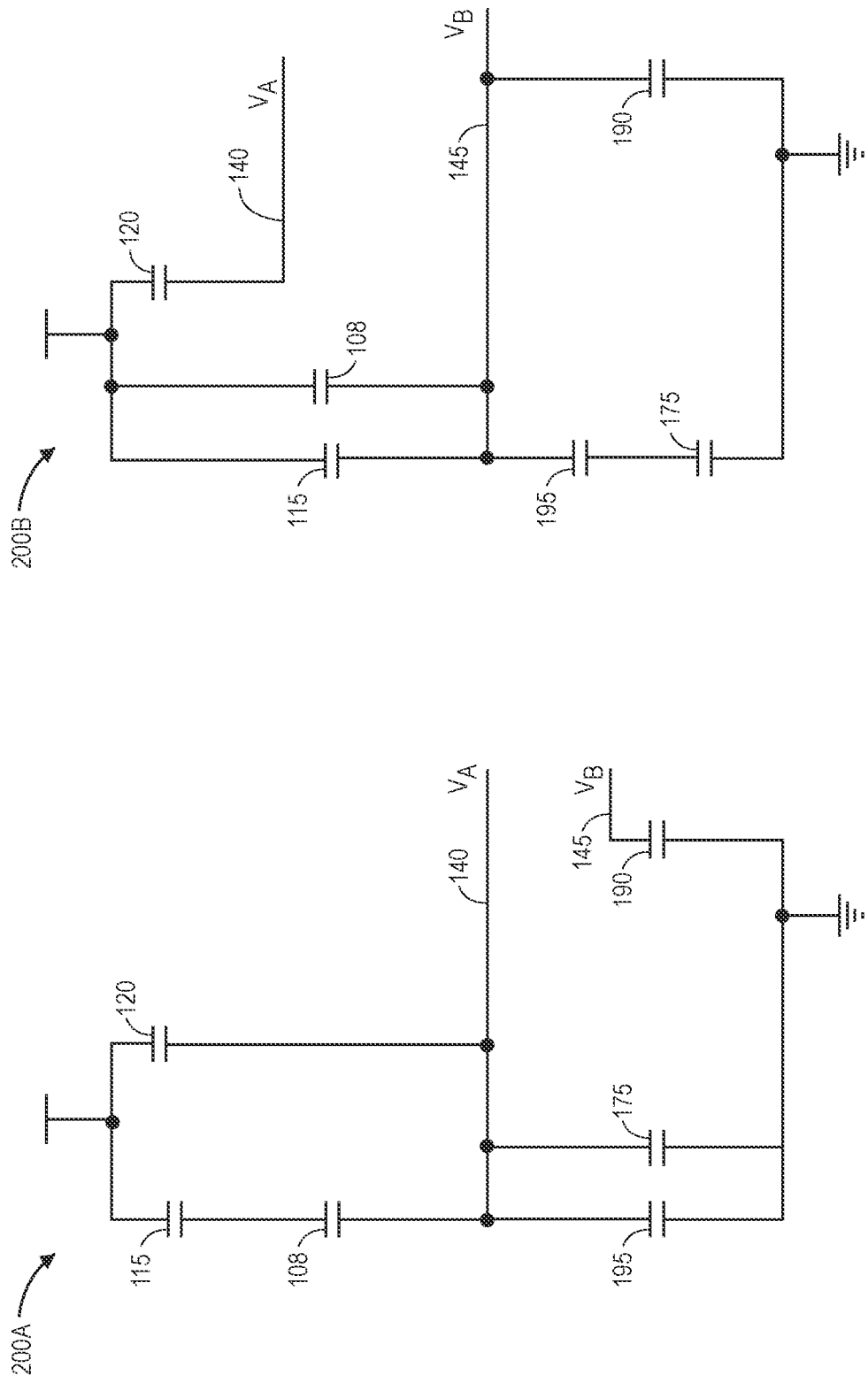
FIG. 2A shows an equivalent circuit of the circuit in FIG. 1A where a first clock is at a high state, according to an embodiment of the disclosure.
FIG. 2B shows an equivalent circuit of the circuit in FIG. 1A where a second clock is at a high state, according to an embodiment of the disclosure.

Turning now to FIGS. 2A and 2B, equivalent circuits of two time periods of operation, as defined by first and second clock signals 122, 124, respectively, of circuit 100 are illustrated. FIG. 2A shows an equivalent circuit 200A where the first clock signal 122 is at a high state and the second clock signal 124 is at a low state. When the first clock is at a high state and the second clock is at a low state, switches 102, 130, 165, 150 and 180 (see FIG. 1) are on, and switches 104, 135, 160, 155 and 170 are off, thus circuit 100 is reduced to circuit 200A in FIG. 2A. During this time period, both capacitors 195 and 175 are coupled in parallel and are used to pull down on capacitor 120 ($C_A$ in FIG. 1B), thus increasing its stored charge. During the next time period shown in FIG. 2B, when the first clock is low and the second clock signal 124 is high, switches 102, 130, 165, 150 and 180 are off, and switches 104, 135, 160, 155 and 170 are on, circuit 100 is reduced to circuit 200B. During this time period, capacitors 195 and 175 are coupled in series and applied to $V_B$ at node 145, increasing the stored charge in capacitor 190 ($C_B$ in FIG. 1B). Thus, in an embodiment where a value of capacitance $C_1$ of capacitors 195, 175, 115, and 108 are equal, and a value of capacitance of capacitors 120 and 190 is $C_1/2$, in the absence of a load current, $V_A$ can drop to $V_{in}/3$ (so that $V_{in}-V_A$ is $2V_{in}/3$), and $V_B$ can go to of $2V_{in}/3$. This is because in FIG. 2A, capacitors 195 and 175 are in parallel, thus their equivalent capacitance is $2C_1$, while capacitors 115 and 108 are in series, thus their equivalent capacitance is $C_1/2$, and in FIG. 2B, capacitors 195 and 175 are in series, thus their equivalent value is $C_1/2$, and capacitors 115 and 108 are in parallel, thus their equivalent capacitance is $C_1/2$. In this way, a value of $V_B$ can be higher than $V_A$, while the drive current from the high side switch is reused for the low side switch.

Figure 3:
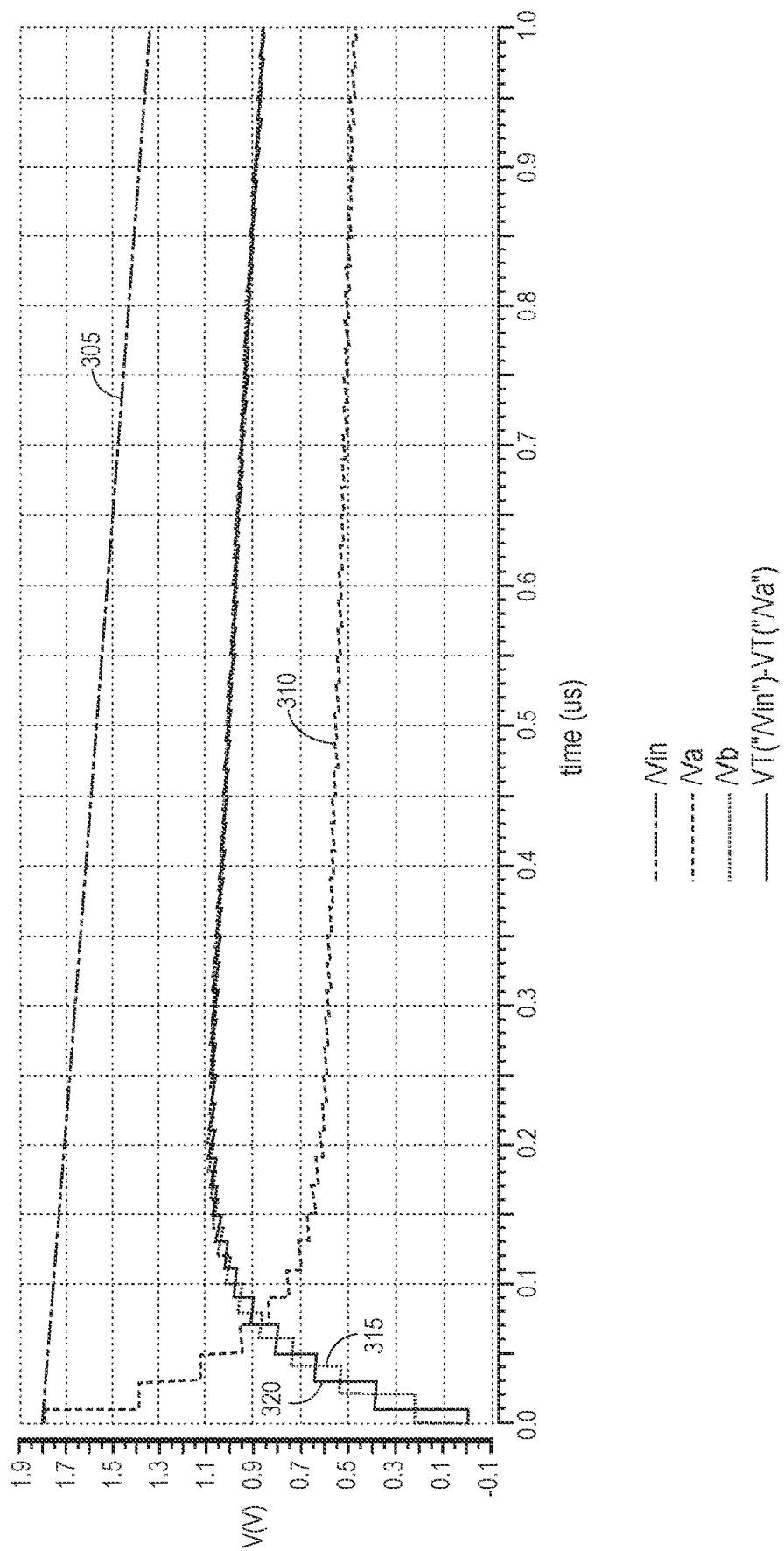
FIG. 3 shows voltages at various nodes in the circuit of FIG. 1A.

FIG. 3 shows voltages at various nodes in circuit 100 (see FIG. 1) as a function of time. Line 305 shows the input voltage $V_{in}$ at node 110, line 310 shows output voltage $V_A$ at node 140, line 315 shows output voltage $V_B$ at node 145, and line 320 shows a value for $V_{in}-V_A$. In this embodiment, $V_B$ rises to about ⅔ of $V_{in}$, and $V_A$ falls to ⅓ $V_{in}$, leaving $V_{in}-V_A$ at ⅔ of $V_{in}$ as well. Further, the current consumption of the circuit is ⅔ $V_{in}/R$, which is lower than a value 2*⅔ $V_{in}/R$ that would have been consumed without a use of embodiments of the present disclosure. In these equations, R is a value for an equivalent resistance for the charging current for each of the high side and low side switches, i.e., resistors 125 and 185, respectively, in FIG. 1. Thus, it can be seen that current recirculation has been achieved. As appreciated by one of ordinary skill in the art having the benefit of this disclosure, there can be other switching sequences for the switches. The illustrated switching sequence for the switches in FIGS. 1, 2A and 2B is one example of the switching sequence.

Figure 4B:
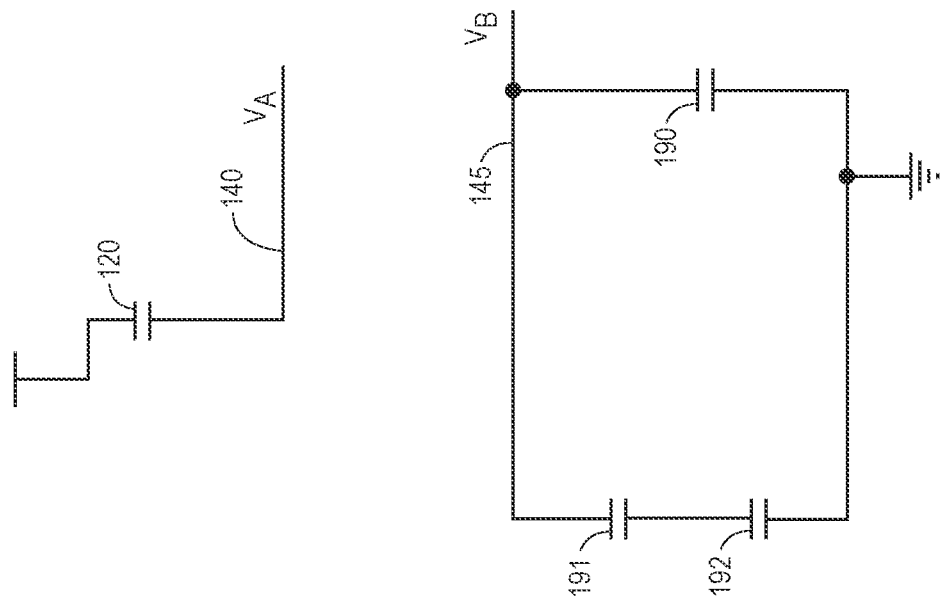
FIGS. 4A and 4B illustrate a single-ended implementation of a switched capacitor recirculating gate drive circuit according to an embodiment of the disclosure.
Figure 4A:
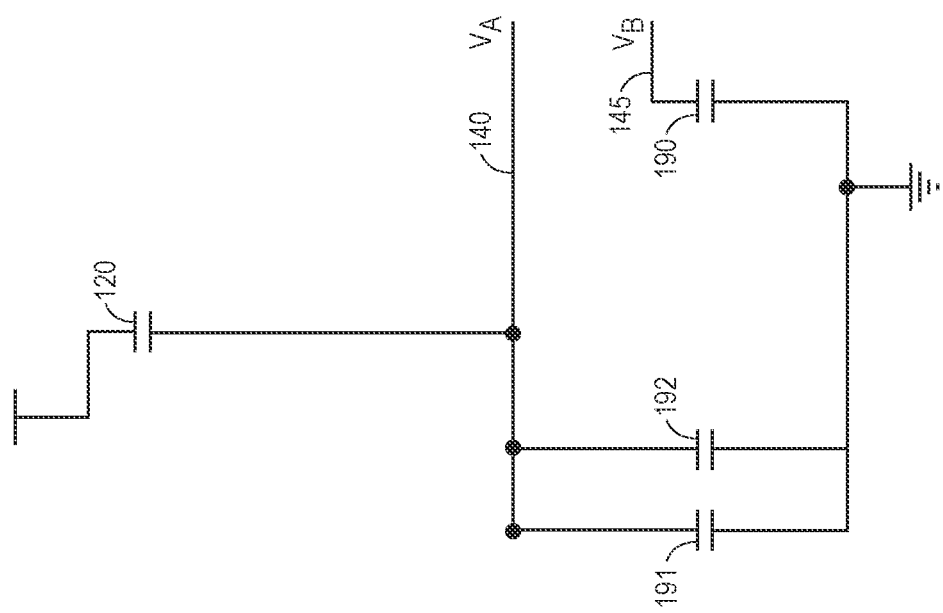

The schematic shown in FIG. 1 is a differential implementation of a switched capacitor recirculating circuit. Some embodiments of the disclosure include a single-ended implementation of a switched capacitor recirculating circuit. FIGS. 4A and 4B illustrate equivalent circuits for a single-ended embodiment. FIG. 4A shows an equivalent circuit during a first time period when the first clock signal 122 is in a high state, and FIG. 4B shows an equivalent circuit during a second time period when the second clock signal 124 is in a high state. During the first time period, capacitors 191 and 192 are coupled in parallel and are used to pull down on capacitor 120, thus increasing its stored charge. During the second time period, capacitors 191 and 192 are coupled in series and applied to $V_B$ at node 145, increasing the stored charge in capacitor 190. Thus, in an embodiment where a value of capacitance $C_1$ of capacitor 191 is equal to a capacitance $C_2$ of capacitor 192, $V_A$ can drop to $V_{in}/3$, and $V_B$ can go to of $2V_{in}/3$. In this way, a value of $V_B$ can be higher than $V_A$, while the drive current from the high side switch is reused for the low side switch.

In some embodiments, when the value for $V_{in}$ is relatively high, a charge pump, a resistor divider, or an LDO can be used to maintain a middle voltage for the drivers 152 and 154 in FIG. 1B. The middle voltage can be a value $V_A=V_B=V_{in}/2$. However, when the value for $V_{in}$ drops to a relatively low value, embodiments of the present disclosure can be used to generate $V_A$ having a value of, for example, $V_{IN}/3$, and to generate $V_B$ having a value of, for example, $2V_{IN}/3$. As appreciated by one of ordinary skill in the art, other suitable values for $V_A$ and $V_B$ can be used.

Although switched capacitor recirculating gate drive circuits are described and illustrated herein with respect to one particular configuration of switched capacitor recirculating gate drive circuits, embodiments of the disclosure are suitable for use with other configurations of switched capacitor voltage converters. For example, multiple-output switched capacitor voltage converter circuits can employ embodiments of the disclosure to generate various other output voltages at output terminals.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A circuit comprising:
   a switched capacitor circuit comprising first, second, third and fourth capacitors coupled to a plurality of switches; and
   a first output terminal, a second output terminal, an power input terminal and a ground coupled to the switched capacitor circuit;
   wherein the switched capacitor circuit repetitively cycles between a first state and a second state;
   wherein when in the first state, the first capacitor is coupled in parallel with the second capacitor, and the first and second capacitors are coupled between the ground and the first output terminal;
   wherein when in the second state, the first capacitor is coupled in series with the second capacitor, and the series connected first and second capacitors are coupled between the second output terminal and the ground;
   wherein when in the first and second states, the first output terminal is connected to the power input terminal via the third capacitor; and
   wherein when in the first and second states, the second output terminal is connected to ground via the fourth capacitor.

2. The circuit of claim 1, wherein the switched capacitor circuit is arranged to generate a first output voltage at the first output terminal and a second output voltage at the second output terminal.

3. The circuit of claim 2, wherein a value of the first output voltage is different than that of the second output voltage.

4. The circuit of claim 2, wherein the second output voltage is greater than the first output voltage.

5. The circuit of claim 2, wherein the first output voltage is ⅓ of a voltage at the power input terminal.

6. The circuit of claim 2, wherein the second output voltage is ⅔ of a voltage at the power input terminal.

7. The circuit of claim 2, wherein the first output voltage is used to drive a high-side transistor of a half-bridge circuit, and the second output voltage is used for driving a low-side transistor of the half-bridge circuit.

8. A circuit comprising:
   an input terminal, a first output terminal and a second output terminal; and
   first, second, third and fourth capacitors coupled to a plurality of switches, the plurality of switches arranged to repetitively cycle the first, second, third and fourth capacitors between a first state and a second state to generate a first output voltage, in response to receiving an input voltage at the input terminal, at the first output terminal and a second output voltage at the second output terminal;
   wherein in the first state, the first and second capacitors are connected in parallel with each other and in series with a third capacitor to apply a first fraction of the input voltage at the first output terminal; and
   wherein in the second state, the first and second capacitors are connected in series with each other and in parallel with the fourth capacitor to apply a second fraction of the input voltage at the second output terminal.

9. The circuit of claim 8, wherein the first fraction is different than the second fraction.

10. The circuit of claim 8, wherein the first fraction is ⅓ of the input voltage.

11. The circuit of claim 8, wherein the second fraction is ⅔ of the input voltage.

12. The circuit of claim 8, wherein the second output voltage is greater than the first output voltage.

13. The circuit of claim 8, wherein the first output voltage is used to drive a high-side transistor of a half-bridge circuit, and the second output voltage is used for driving a low-side transistor of the half-bridge circuit.

14. A power conversion circuit comprising:
   a circuit comprising first, second, third and fourth capacitors coupled to a plurality of switches; and
   a first output terminal, a second output terminal, an input terminal and a ground coupled to the circuit;

wherein the circuit repetitively cycles between a first state and a second state to generate a first output voltage at the first output terminal and a second output voltage at the second output terminal;

wherein when in the first state the first capacitor is coupled in parallel with the second capacitor, and the first and second capacitors are coupled between the ground and the first output terminal;

wherein when in the second state the first capacitor is coupled in series with the second capacitor, and the series connected first and second capacitors are coupled between the second output terminal and the ground;

wherein the first output terminal is connected to the input terminal via the third capacitor;

wherein the second output terminal is connected to ground via the fourth capacitor; and wherein the first output voltage is used to drive a high-side transistor of a half-bridge circuit, and the second output voltage is used for driving a low-side transistor of the half-bridge circuit.

15. The power conversion circuit of claim 14, wherein a value of the first output voltage is different than that of the second output voltage.

16. The power conversion circuit of claim 14, wherein the second output voltage is greater than the first output voltage.

17. The power conversion circuit of claim 14, wherein the first output voltage is ⅓ of a voltage at the input terminal.

18. The power conversion circuit of claim 14, wherein the second output voltage is ⅔ of a voltage at the input terminal.

19. The power conversion circuit of claim 14, further comprising a fifth capacitor and a sixth capacitor, wherein when in the first state the fifth capacitor is coupled in series with the sixth capacitor, and the fifth and sixth capacitors are coupled between the input terminal and the first output terminal.

20. The power conversion circuit of claim 19, wherein when in the second state, the fifth capacitor is coupled in parallel with the sixth capacitor, and the fifth and sixth capacitors are coupled between the input terminal and the first output terminal.

* * * * *